(12) United States Patent
Wickham et al.

(10) Patent No.: US 6,708,003 B1
(45) Date of Patent: Mar. 16, 2004

(54) OPTICAL ENERGY TRANSMISSION SYSTEM UTILIZING PRECISE PHASE AND AMPLITUDE CONTROL

(75) Inventors: Michael G. Wickham, Rancho Palos Verdes, CA (US); Eric L. Upton, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/466,370

(22) Filed: Dec. 16, 1999

(51) Int. Cl.[7] .......................... H04J 14/08; H04B 10/00
(52) U.S. Cl. ...................................... 398/102; 398/161
(58) Field of Search ............................. 359/157, 193, 359/140, 123, 124, 126–129, 130–131, 132, 138, 153, 161, 181–187; 398/53, 77, 79, 82, 86–88, 93, 150, 161, 162, 177, 183, 190, 198, 209, 212, 213, 102; 385/14, 27, 39

(56) References Cited

U.S. PATENT DOCUMENTS

| | | | | |
|---|---|---|---|---|
| 4,989,199 A | * | 1/1991 | Rzeszewski | 359/123 |
| 5,073,983 A | * | 12/1991 | Pfizenmayer | 359/187 |
| 5,333,000 A | * | 7/1994 | Hietala et al. | 342/368 |
| 5,541,757 A | * | 7/1996 | Fuse et al. | 359/125 |
| 5,636,045 A | * | 6/1997 | Okayama et al. | 359/140 |
| 5,691,832 A | * | 11/1997 | Liedenbaum et al. | 359/115 |
| 5,694,388 A | * | 12/1997 | Sawahashi et al. | 370/206 |
| 5,703,708 A | * | 12/1997 | Das et al. | 359/140 |
| 5,745,275 A | * | 4/1998 | Giles et al. | 359/187 |
| 6,081,369 A | * | 6/2000 | Waarts et al. | 359/341.33 |
| 6,163,296 A | * | 12/2000 | Lier et al. | 342/417 |
| 6,175,671 B1 | * | 1/2001 | Roberts | 385/14 |
| 6,256,124 B1 | * | 7/2001 | Hait | 359/123 |
| 6,256,130 B1 | * | 7/2001 | Bulow | 359/173 |
| 6,404,535 B1 | * | 6/2002 | Leight | 359/306 |

* cited by examiner

*Primary Examiner*—Leslie Pascal
*Assistant Examiner*—Dalzid Singh

(57) ABSTRACT

An optical transmission system includes an optical source for providing an input optical signal to an optical array having a plurality of delay lines, and by utilizing orthogonal code modulation for active optical wave component control, the optical signal split among the plurality of delay lines is phase and amplitude modulated for efficient transmission to a destination point.

14 Claims, 5 Drawing Sheets

OPTICAL ENERGY TRANSMISSION SYSTEM UTILIZING PRECISE PHASE AND AMPLITUDE CONTROL

CROSS REFERENCES

This invention is related to patent application Ser. No. 09/042,928, filed Mar. 17, 1998, entitled "Multiple Channel Control Using Orthogonally Modulated Coded Drive Signals" by inventors E. Upton and M. Wickham, the disclosure of which is incorporated herein.

BACKGROUND OF THE INVENTION

1. Field of the Invention

The present invention relates generally to a system for providing optical energy transmissions and, more specifically to such a system that increases the resolving power, spectral shaping benefits, and efficient transfer of optical power for such transmission by active and precise phase and amplitude control.

2. Description of the Prior Art

Many applications of optical transmission systems, such as communication applications and laser weapon applications, require precise control of a wavefront profile of transmitted optical energy. Aberrations in the wavefront profile typically include phase, focus, or similar astigmatic characteristics that, absent correction, may significantly impact the functional capabilities of the particular transmission system.

Optical communication can be accomplished by transmitting signals on optical carriers and routing these signals based on optical wavelength—a technique known in the art as wavelength division multiplexing (WDM). Using wavelength division multiplexing, multiple optical signals can be simultaneously transmitted within an optical spectrum by assigning each optical signal a unique wavelength. An important aspect of an optical communication system using WDM, and other similar optical communication methods, is an optical array or optical grating device that has the capability to accurately distinguish each optical wavelength from each other optical wavelength contained within the optical spectrum.

The ability to distinguish adjacent wavelength components is known as the "resolving power" of the optical grating device, and is equal to the ratio between the wavelength at which the device is operating and the smallest change of wavelength that the device can distinguish. In other words, to calculate the resolving power of a particular grating device, it must be determined how close any two wavelength patterns can be without merging into each other.

A key element in an optical grating device's ability to resolve optical radiation is the use of diffracting elements which form a grating that redirects optical radiation by an amount that is wavelength dependant. In conventional arrayed waveguide grating devices (AWGs), each element of the grating is an optical waveguide of varying length. In conventional fiber optical delay line grating devices (FODLGs), each element is an individual fiber optic delay line of varying length.

Single wavelength radiation arriving incident upon a grating at an angle $\theta_i$, diffracts at an angle $\theta_r$ according to its wavelength(s) $\lambda$. Specifically, segments of the optical spectrum containing the wavelength(s) $\lambda$ are diffracted in order at equal magnitudes along the N grating lines or grooves of the grating. The formation of this "diffracted order" depends on the wavelength(s) $\lambda$ and on the wave segment contributions from each grating line being in phase by an integral number of wavelengths. This means that the path difference or time delay across successive delay lines should be equal to within a whole number of wavelengths, as defined in accordance with the following general grating equation:

$$\text{incremental time delay} = d(\sin \theta_i - \sin \theta_r) = m\lambda \quad (1)$$

where d=distance between any two adjacent grating lines (nm), $\theta_i$=angle optical radiation incident upon grating (microradians or milliradians), $\theta_r$=angle optical radiation diffracted by grating (microradians or milliradians), m=diffracted order (integer), and $\lambda$=operating wavelength (nm).

It is evident from equation (1), that if the time delay across successive grating lines or grooves is equal to whole number of wavelengths, the wave segments will be "in-phase" (i.e. phase difference equals integer multiples $\lambda$) with each other, and they will add constructively. Proper constructive addition of the wave segments insures that all of the optical energy for the optical spectrum is decomposed through the grating to form a high intensity optical signal that can be spectrally separated by wavelength at the focal plane of the optical grating device. If the wave segments are out of phase by a significant percentage of wavelength, the individual segments will add destructively. Reduced optical power will be emitted from the grating, and the ability to resolve wavelength components at the focal plane of the grating device is reduced.

Several circumstances may contribute to the likelihood of out of phase conditions in optical grating devices. Since conventional optical grating devices are passive devices, the incremental delay of each device is determined by manufacturing tolerances and processes that set the length of each delay line. However, rarely is the required level of precision to within a small fraction of $\lambda$ achievable. Additionally, the grating device may later be subject to thermal fluctuations where a temperature variance of as little as fraction of a degree may cause the grating to expand or contract. Such expansion or contraction may cause the delay line path length to change and, therefore, the time delay for one or many grating lines to be out of phase. Similarly, mechanical stress may adversely affect the topology of the delay line and cause out of phase conditions.

The publication "Fabrication of 128-channel arrayed-waveguide grating multiplexer with 25 Ghz channel spacing", by Okamoto et al., Electronics Letters Vol. 32 No. 16 pp. 1474–1475, Aug. 1, 1996, is illustrative of the shortcomings of conventional optical grating devices. Specifically, the Okamoto et al. publication discloses achieving a 25 GHz resolution with a 128-channel arrayed waveguide grating (AWG) multiplexer using a planar lightwave circuit (PLC). The Okamoto et al. publication distinguishes its AWG device from other conventional AWG multiplexer devices that are limited to a resolution (channel spacing) greater than 50 GHz. The Okamoto et al. publication describes that at narrower channel spacing, conventional devices "exhibited higher crosstalk due to phase errors in the array waveguides." While AWG's similar to that described in the Okamoto et al. publication may reduce crosstalk levels and increase resolving power, they may be inadequate in circumstances where manufacturing tolerances, thermal fluctuation and mechanical stress significantly limit the in-phase conditions necessary for analog radio frequency (RF) applications and other applications that require higher levels of signal isolation.

Laser weapon applications are similarly affected by phase, focus and astigmatic aberrations. Such wavefront aberrations are typically the result of vibration and misalignment of the reflecting surfaces, thermal fluctuations that cause warping of the lasing medium and other internal components, and turbulence in the lasing medium. Controlling these wavefront aberrations directly impacts a laser weapon's ability to determine target ranging, steer the laser beam, and optimally deliver laser power to a remote target.

Thus, an optical transmission system that mitigates the effects of phase misalignment and provides the benefit of spectral shaping by amplitude adjustment is highly desirable.

SUMMARY OF THE INVENTION

The preceding and other shortcomings of the prior art are addressed and overcome by the present invention that provides an optical transmission system. The system includes a source for transmitting an input optical signal, an optical array having a primary input for receiving the optical signal and a plurality of delay lines. An optical splitter is located at the primary array input of the optical array and splits the input optical signal into a plurality of delay line signals, where each one of the delay line signals is input to one corresponding delay line and each delay line carries a corresponding delay line signal to a destination point located at the delay line outputs. A means for phase and amplitude modulating the optical wave component of each delay line signal utilizing orthogonal code modulation is provided.

BRIEF DESCRIPTION OF THE DRAWINGS

Reference is now made to the following description and attached drawings, wherein.

DETAILED DESCRIPTION OF THE INVENTION

Figure 1:
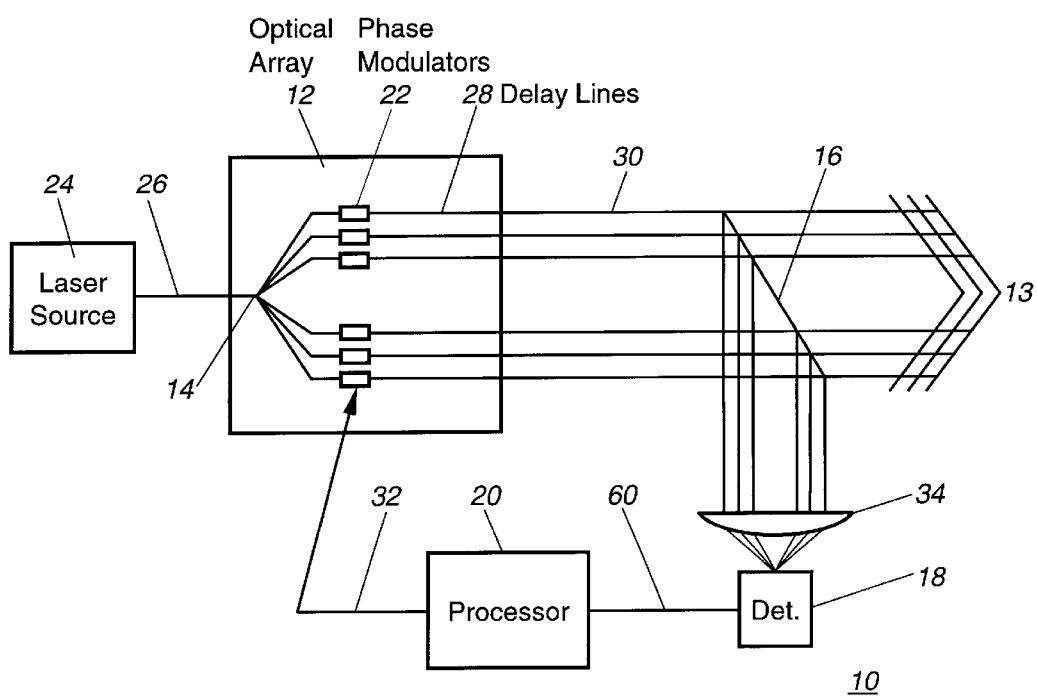
FIG. 1 is a block diagram of a system for providing delay line control for an optical array in accordance with the present invention.

Referring to FIG. 1, a system 10 for providing optical transmission to a particular destination utilizing an optical array 12 is illustrated. As later described in detail, each delay line of the optical array 12 contains a modulator capable of changing the optical phase and amplitude wave components of an optical signal carried by each delay line. Utilizing multiple servo loops serviced by a single CDMA processor, the multiple modulators are servo controlled simultaneously with orthogonally coded control signals applied at each modulator.

The system 10 includes an optical splitter 14, an optical detector 18, modulators 22, and a processor 20. Further, the system 10 includes a primary laser source 24 that injects an optical signal 26 into the optical array 12 where an N×M port optical splitter 14 splits the optical signal 26 into the N×M delay lines 28 of the optical array 12. To avoid any redundancy in describing the preferred embodiment of the present invention, FIG. 1 illustrates a 1×M optical splitter 14 and a 1×M optical array 12. The optical array 12 may be an arrayed waveguide grating (AWG) device, fiber optic delay line grating (FODLG) device, a high power optical phased array, or a similar device having up to thousands of delay lines 28. Depending on the optical array device 12, the delay lines 28 may be formed from lines or grooves built into planar waveguides (e.g. silica), fiber optic cables, or any other structure having the ability to channel optical energy.

Each delay line 28 carries a delay line signal 30 that is some fraction of the optical signal 26 and each delay line 28 contains a modulator 22 capable of controlling the optical phase of the delay line 28. In an alternate embodiment of the present invention described hereinafter, the present invention may also include optical amplitude control. The multiple modulators 22 are servo controlled simultaneously with orthogonally coded phase modulation applied at each modulator 22.

The optical detector 18 may be a photodetector, a detector array or a similar device having optical detection capabilities. A beam sampler 16 and a lens 34 are included to sample the optical energy output from each delay line 28. The beam sampler 16 redirects a portion of optical energy from each delay line 28. These sampled portions of optical energy are coupled at the lens 34 to the optical detector 18 and later input to the processor 20 which determines any necessary wave component (amplitude or phase) adjustments. The optical energy 13 not redirected by the beam sampler 16 is output from each delay line 28 to an emitter end of the optical system 10 where such optical energy 13 may be spectrally separated, as with WDM applications or, as with laser weapon and similar applications, transmitted to a particular destination.

The system 10 includes a processor 20, that includes a plurality of orthogonally coded servo loop controllers (shown in FIG. 2) that are utilized for providing delay line control for each one of the N delay lines 28 in the optical array 12. To minimize circuitry, the processor 20 services all servo control loops and each servo loop (see FIG. 2) is independently processed by the processor 20 in a time-shared digital programmable gate array at the desired coded chip rate.

Figure 2:
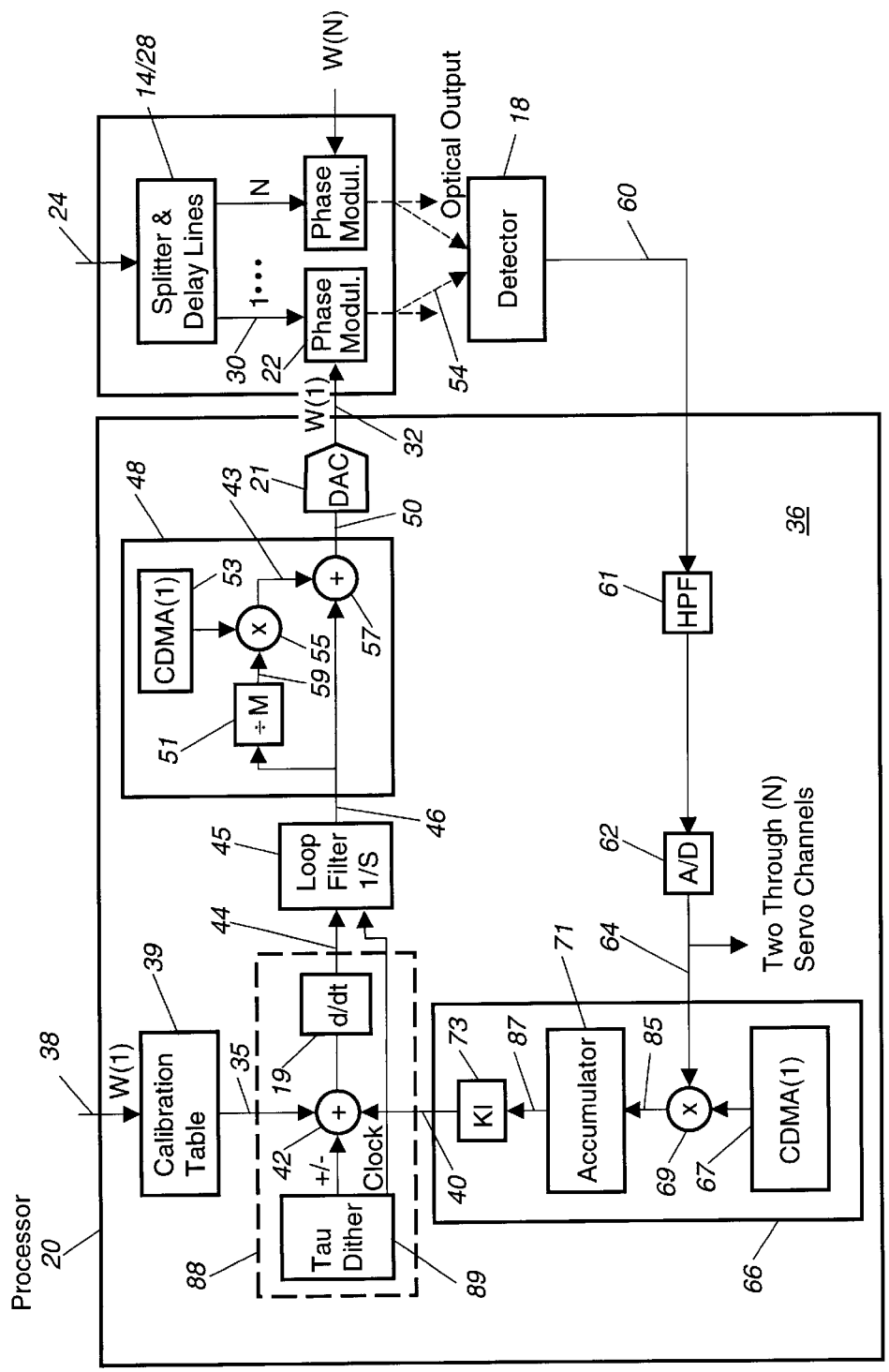
FIG. 2 is a schematic diagram of an orthogonal servo controller for providing phase servo loop control for the optical array.

Referring to FIG. 2, the solid path lines represent the electrical pathways while the dashed lines represent optical pathways. Although for exemplary purposes the servo controller loop 36 is shown providing servo control for a single delay line 28, the present invention may be utilized: to provide servo control for each modulator 22 in the delay line 28.

The weight W(1) 38, is input to a calibration table 39. The calibration table 39 provides calibrated values for non-first order linear inputs and stores values of weights for achieving a desired transform. An error signal 44, comprised of an output 35 from the calibration table 39 and a demodulated feedback signal 40 that have been combined in the summer 42, is applied to the loop filter 45 through a differentiator 19. The differentiator 19 differentiates between a current value of error 44 and a value of error 44 derived after the two hypothesis injections (+/−) are applied by the tau-dither 89 into the summer 42. The clock applied by the tau-dither 89 at the loop filter 45 synchronizes the error differential with the two hypothesis injections (+/−) so that the error signal 44 is derived correctly in the proper phase of the hypothesis action. The loop filter 45 includes an integrator (1/S) to sum successive errors 44 by utilizing the error differential determined at the differentiator 19 which is summed as the error 44 by the integrator (1/S laplace). A tau-dither loop 88 is used in phase servo control to maximize the power of the detector 18 achieved for each delay line element at its respective orthogonal CDMA code. The tau-dither approach hypothesizes the step (+/−) in either phase differential polarity from the tau-dither 89 and then selects and integrates that selection as a function of minimizing the error signal 44 shown in the loop filter 45. The loop filter 45 optimizes the closed loop transfer function of the servo and determines the control loops dynamic response. The filtered control signal 46 at the output of the loop filter 45 is applied to an orthogonal code modulator 48 that modulates the control signal 46 with a unique code from an orthogonal code set.

Each delay line's servo acquires its independence from the other delay line's servos utilizing a unique orthogonal code modulated onto the existing delay line signal. The orthogonal code modulator 48 includes a scalar 51, a coder 53, a mixer 55, and an adder 57. The control signal 46 is initially attenuated by the scalar 51 that divides the control signal 46 by a scaling constant M, thus allowing the control signal 46 to be code modulated at a desired amplitude. The value of the proportionality constant M may be determined in accordance with numerous factors, including but not limited to, a value that would maintain the amplitude of the modulated signal small in comparison to the processed signals of interest. The resultant orthogonal code modulations are thus preferably attenuated in amplitude such that the code modulations are transparent to the processed signals of interest.

The scaled control signal 59 is then multiplied with the desired orthogonal code via the mixer 55. The code is generated by the coder 48, preferably an orthogonal code division multiple access (CDMA) coder 48. The code sequences provided by the CDMA coder are preferably orthogonal, with zero or near zero cross-correlation characteristics. In particular, orthogonal codes such as Gold or Walsh codes may be used.

The coded control signal 43 is added to the control signal 46 via the summer 57 to generate a modulated control signal 50, modulated by the orthogonal code set described above. The orthogonal code length of several thousand chips (e.g. 2047) is transparent to the control signal of interest, but the code's length enables each delay line's feedback signal independent recovery from the aggregate of signals and codes through processing gain realized in each loop's recovery circuit. A plurality of delay lines can thus be servo controlled simultaneously. The digital to analog converter (DAC) 21 converts each modulated control signal 50 to an analog control signal 32.

The analog control signal 32 is applied to a corresponding delay line modulator 22 which adjusts the wave component (e.g. phase) of that particular delay line 28 towards the desired weight W(N) 38. The electrical weight W(N) with its coded envelop is an analog control signal 32 and is applied to each phase modulator 22 and this control signal indicates the desired adjustment for a particular delay line 28.

Each modulator 22 (or waveguide segment) is formed from lithium niobate, aluminum gallium arsenide (AlGaAs) or similar photonic semiconductor materials deposited in a segment of a corresponding delay line 28. The waveguide segment material is chosen for its electro-optical properties, namely, properties that facilitate the application of an electric charge to the electrodes of the waveguide segment material to create a corresponding change in the index of refraction of the waveguide segment material. By applying the electrical signal of the control signal 32 to the waveguide segment material, the refractive index of the waveguide segment material can be modified. Since the refractive index of a particular medium is inversely related to the propagation velocity of light traveling through it, an optical signal passing through a waveguide segment 22 having a higher refractive index would have an attendant longer optical path length. Conversely, an optical signal passing through the modulator waveguide segment 22 having a lower refractive index would have a shorter optical path length.

Figure 3:
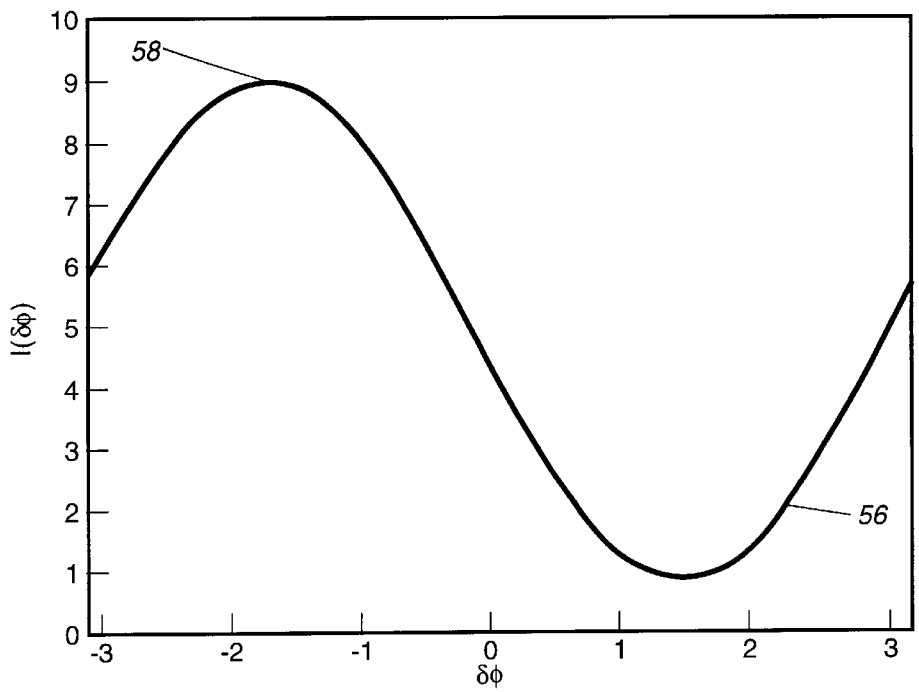
FIG. 3 is a graphical illustration of the adjustment of the net intensity of an optical signal in accordance with the present invention.

As illustrated in FIG. 3, the desired phase adjustment of each delay line 28 contributes to the net intensity (I) or power of the input optical signal 26 and the net intensity either increases or decreases in response to such adjustment. If the response to the adjustment of a particular delay line 28 is positive, the phase of the delay line 28 is continually adjusted until the response becomes negative. If the response is negative, the phase of delay line 28 is continually adjusted until the response becomes positive. The phase 56 in the emitter of delay line 1 is adjusted until the intensity (I) is maximized to a point 58.

Alternatively, the modulator 22 may be a piezoelectric or similar device capable of receiving an electric charge and, based on that charge, expanding or contracting the delay line to the desired optical path length. Moreover, where precise phase control is required, the modulator need only be able to modify the optical path length of the particular delay line.

Referring again to FIG. 2, the control signal 32, modulates a unique CDMA code onto each delay line signal 30 thereby producing a plurality of modulated delay line signals 54. The single photodetector 18, after coupling from a beam splitter 16 and lens 34 (see FIG. 1), combines each of the modulated delay line signals 54 coming from each servo controller loop 36 to form a net signal 60. After filtering at a high pass filter 61 located within the processor's 20 servo controller 36 to block the DC component, an analog to digital converter 62 converts the net signal 60 to a digital signal 64. The digital signal 64 is applied to a demodulator 66 with corresponding orthogonal CDMA code used to modulate the delay line of interest thereby distinguishing each control signal within the aggregate digital signal 64 from each other. In particular, each code's length will enable each delay line's servo controller to independently recover the delay line's feedback signal from the aggregate of signals and codes through the processing gain realized in each loop's recovery circuit. Thus, the present invention establishes simultaneous control while maintaining independence between the control signals. To determine the status of each delay line, each one of the codes can subsequently be detected independently.

The demodulator 66 includes a corresponding CDMA coder 67 for correlation, a mixer 69, an accumulator 71, and a scalar 73. The digital signal 64 is multiplied with the signal from the coder 67 via the mixer 69. The demodulated signal 85, output at the mixer 69, is applied to the accumulator 71, which accumulates each chip of the particular code for delay line N thereby providing the necessary processing gain to extract the independent value of delay line N. The demodulated signal 87 is then applied to a constant of proportionality 73, which adjusts the signal 87 and the loop gain by a constant factor K. The adjustment factor K, is used to relate the different loop gains that occur during detection and insertion loss that occurs over different parts of the system. The demodulated feedback signal 40 is applied to a summer 42 to complete the servo loop feedback and control.

As a result, a plurality of delay lines can be servo controlled simultaneously to provide for active and precise delay line control in wide bandwidth applications or other applications where a desired precision is unachievable by manufacturing tolerances, or a desired precision is affected by temperature fluctuations and mechanical stresses.

Figure 4:
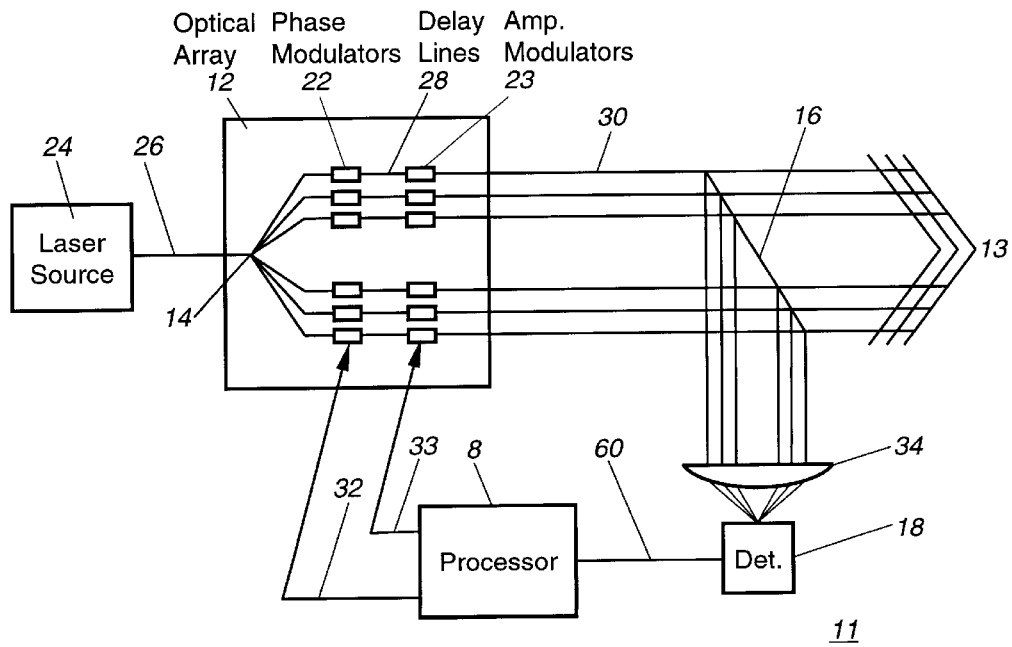
FIG. 4 is a block diagram of an alternate embodiment of the system illustrated in FIG. 1.

Referring to FIG. 4, in accordance with an alternate embodiment of the present invention, a system 11 having similar components and operation as the system 10 shown in FIG. 1, with the inclusion of a set of signal amplitude modulators 23, is illustrated. Each of the amplitude modulators 23 adjusts the amplitude of a corresponding delay line signal 30 via a separate control signal 33.

Figure 5:
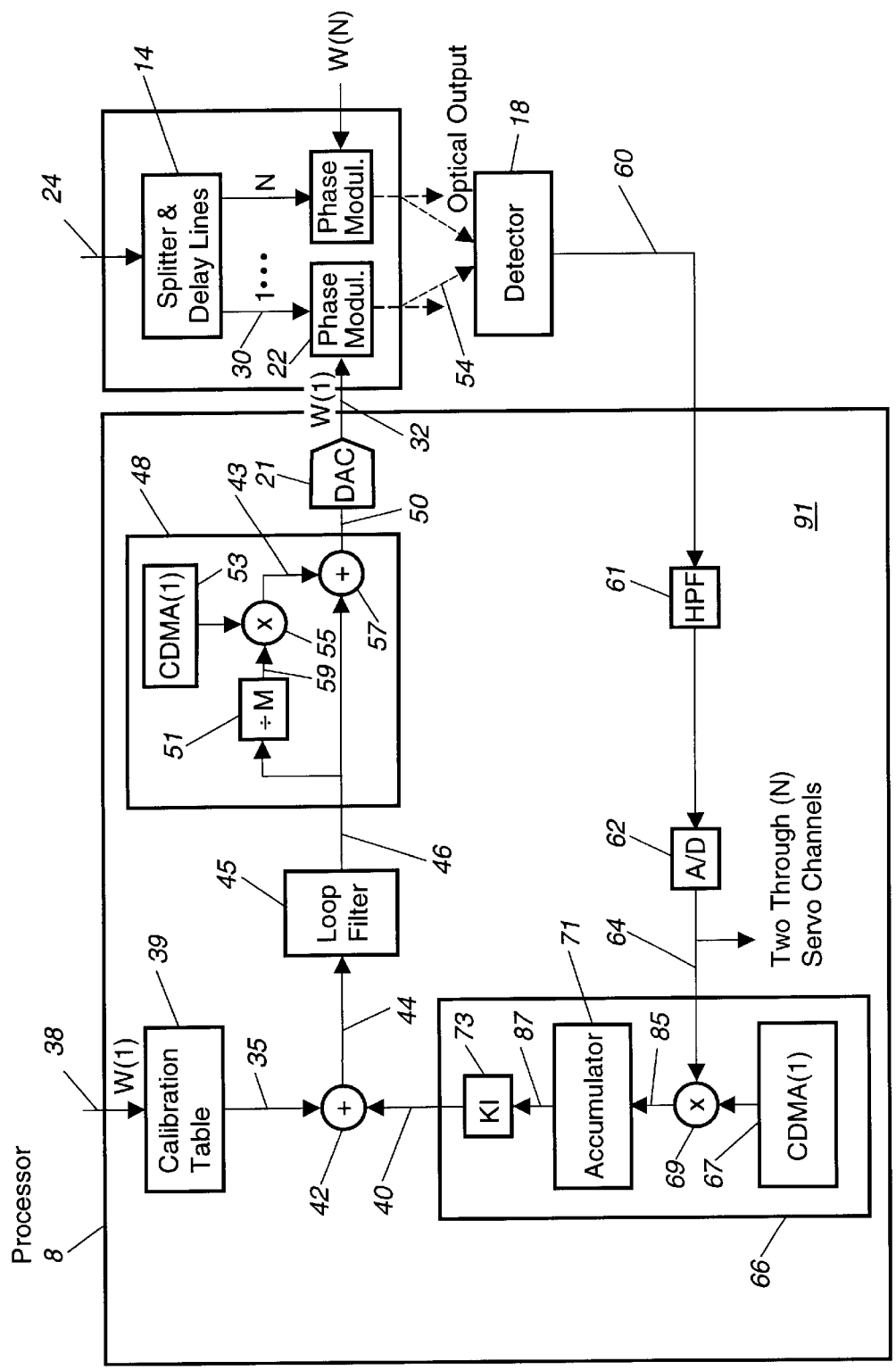
FIG. 5, is a schematic diagram of an orthogonal servo controller for providing amplitude servo loop control for the optical array.

Referring to FIG. 5, a servo control loop 91 for providing amplitude modulation having similar components and operation as the servo control loop 36 shown in FIG. 2, with the exclusion of the tau-dither loop 88 required for phase control, is illustrated. As previously described, the processor 8 services all servo control loops, including those utilized for amplitude modulation, and each servo loop is independently processed by the processor 8 in a time-shared digital programmable gate array at the desired coded chip rate.

Figure 6:
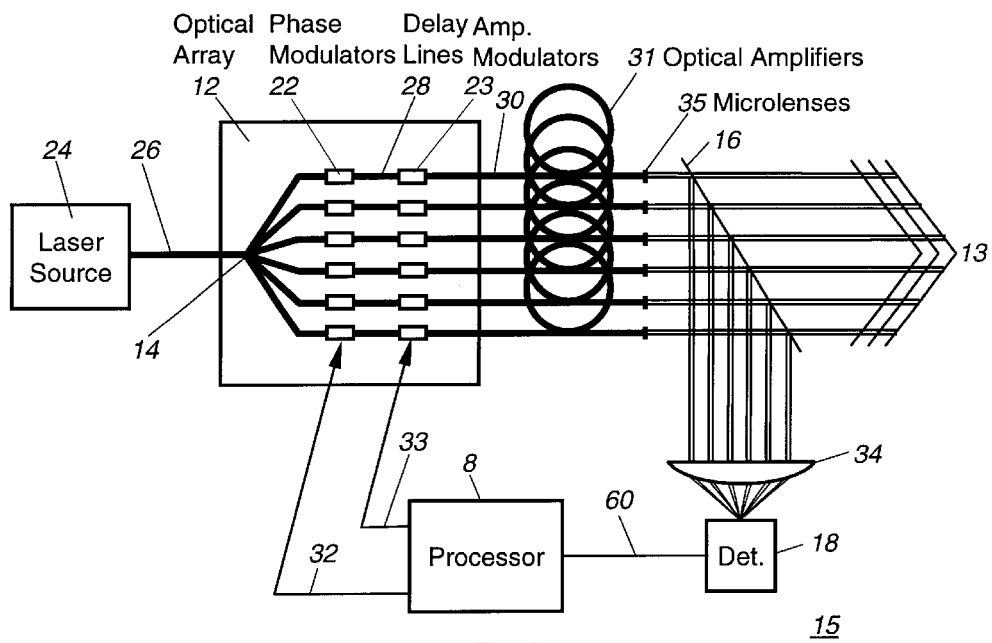
FIG. 6 is a block diagram of an additional alternate embodiment of the system illustrated in FIG. 4.
Figure 7:
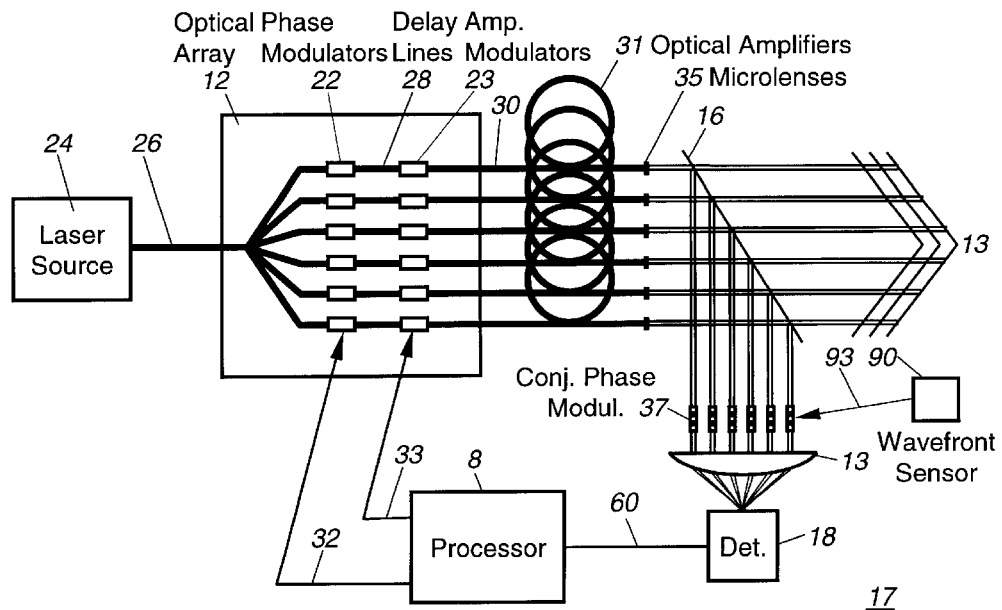
FIG. 7 is a block diagram of a further alternate embodiment of the system illustrated in FIG. 6.

The amplitude modulators 23, shown in FIGS. 4, 6 and 7, may be utilized to provide spectral shaping benefits that may include apodizing the spectral array profile, or accommodating intensity profile distortions caused by atmospheric propagation. For apodizing the array profile, an optimum far field pattern (i.e. highest energy on target and tight focus) can be effected by smoothing the edges of the array by attenuating the amplitudes of each delay line to form a one or two-dimensional array vector. Therefore, instead of a uniform intensity profile the intensity profile would be similar to a guassian profile. To accommodate intensity profile distortions caused by atmospheric propagation, a similar benefit (tight focus) may be achieved. Namely, when a beam propagates through the atmosphere, the intensity profile can become patterned or areas of dark and light can be created. This leads to a greater spreading of the beams by diffraction. So by attenuating the delay line elements in reverse, making the bright spots dark, the deleterious effects of atmospheric perturbation can be prevented before the beam propagates through the atmosphere. Similarly, phase adjustors may mitigate phase distortions (beam spreading) caused by the atmosphere. Additionally, higher quality frequency separation can be achieved by amplitude shaping the array vector to effect reduced adjacent channel interference or crosstalk, and by applying the proper amplitude weights on particular delay lines, one can cancel (null) a particular wavelength band where a strong interferer or jammer is present. Using the principles of the present invention, the null channel could track interference that is frequency hopping.

Referring to FIG. 6, in an additional embodiment of the present invention, a system 15 having similar components and operation as the system shown in FIG. 4 is shown, with the inclusion of a set of optical amplifiers 31 and a set of microlens 35. Each of the optical amplifiers 31, preferably erbium-doped polarization maintaining fiber amplifiers like those sold by Lucent™ under part numbers R37PM01 and R37PM02, provides the delay line amplification that would be required for a high power optical phased array application and each of the microlens 35 provides additional coupling of optical energy at the output (emitter) of each delay line 28, as also required for high power optical phased arrays.

Referring to FIG. 7, in another embodiment of the present invention, a system 17 having similar components and operation as the system 15 shown in FIG. 6 is illustrated, with the inclusion of a set of conjugate phase modulators 37. By including the conjugate phase modulators 37, the system 17 can be utilized for applications requiring precise beam formation and steering or atmospheric correction. The conjugate phase modulators 37, preferably lithium niobate waveguide sections, gallium aluminum arsenide (GaAlAs) sections, or other photonics semiconductor material sections like those previously described, are each deposited within an optical path between each corresponding delay line output and the photodetector 18. A low power optical laser or probe beam (not shown) is utilized to determine the required atmospheric correction for the primary laser source 24. The probe beam is pointed at a target and as the optical laser propagates through the atmosphere to the target, the light that is reflected back will be distorted in the same manner as the primary laser source 24 would be distorted. Specifically, the optical phase front of the beam and the optical intensity across the beam front would be distorted.

By applying an optical phase front 93 read by the probe beam to the conjugate phase modulators 37 utilizing a wavefront sensor 90, and adjusting the phase modulators 22 towards the point conjugate solution of the probe beam phase using the CDMA delay line control previously described, the atmospheric distortion is removed creating a flat phase front that can be optimized to a sharp focus. Preferably, the probe beam is created by "sacrificing" the early emissions of the primary laser source 24, however, the probe beam can be a separate beam that is oriented parallel to the primary laser source beam or it can be any other beam capable of determining the atmospheric correction required for the primary laser source beam. Additionally, the delay line amplitudes can be adjusted to make the intensity distribution of the primary laser source 24 uniform as it arrives at the target.

The present invention takes advantage of servo controlled CDMA modulation to facilitate precise phase and amplitude adjustment in the delay lines of optical arrays. By modulating a unique CDMA code on a signal carried by a corresponding optical array delay line, a single processor can distinguish each individual delay line signal from other delay line signals and independently determine the phase and amplitude adjustments which are appropriate for a particular delay line.

Precise phase adjustment can provide increased resolving power in ultra-dense wavelength division multiplexers (WDM) applications or other applications employing the use of arrayed waveguide gratings, fiber optic delay line grating, or similar optical arrays. By controlling the optical path length of the delay lines of optical arrays, thereby mitigating out of phase conditions, the resolving power of the optical array may be increased. Thus, optical energy reaching the focal plane of the optical system from the delay line outputs will arrive in phase and can be spectrally distinguished (resolved) and routed to a predetermined destination.

Furthermore, by utilizing precise phase and amplitude adjustment, the present invention may also provide advantages for high power optical phased array applications, precise beam formation and steering or atmospheric correction for high-energy laser weapons, RF channelizers, interference signal nullers, and optical encryption systems.

Obviously, many modifications and variations of the present invention are possible in light of the above teachings. Thus, it is to be understood that, within the scope of the appended claims, the invention may be practiced otherwise than as specifically described above.

What is claimed is:

1. An optical transmission system, comprising:
    a source for transmitting an input optical signal;
    an optical array having a primary input for receiving said optical signal;
    a plurality of delay lines, each said delay line having an input, an output, and a predetermined optical path length;
    an optical splitter coupled to said primary input, for splitting said input optical signal into a plurality of delay line signals, each of said delay line signals being input to one corresponding delay line input and each said delay carries its respective delay line signal to a destination point located at said delay line outputs;
    means for producing a plurality of control signals, utilizing orthogonal code modulation, to control the modulation of an optical wave component of each said delay line signal; and
    means for modulating each said delay line optical wave component according to said corresponding control signal;
    and wherein said means for producing a plurality of control signals comprises a processor for receiving electrical signals derived from output optical signals sampled at said delay line outputs, and for generating therefrom each one of said control signals by independently determining an optimal modulation value of said optical wave component of each of said corresponding delay line signals.

2. An optical transmission system as recited in claim 1, wherein said delay line optical wave component is an optical phase.

3. An optical transmission system as recited in claim 1, wherein said delay line optical wave component is an optical amplitude.

4. An optical transmission system as recited in claim 1, wherein said means for modulating each said delay line optical wave component comprises:
    a plurality of phase modulators, wherein each said phase modulator is a waveguide segment located in a section of one corresponding delay line and having means for adjusting said delay line optical path length according to said corresponding control signal.

5. An optical transmission system as recited in claim 4, wherein said waveguide segment is formed of a material having a variable index of refraction, such that when an electric signal is applied to said waveguide segment said variable index of refraction is correspondingly modified.

6. An optical transmission system as recited in claim 5, wherein said waveguide segment material is a photonics semiconductor material.

7. An optical transmission system as recited in claim 5, wherein said waveguide segment material is selected from the group consisting of lithium niobate and gallium aluminum arsenide.

8. An optical transmission system as recited in claim 4, wherein each said modulator is a piezoelectric device.

9. An optical transmission system as recited in claim 4, wherein said means for modulating each said delay line optical wave component further comprises:
    a plurality of amplitude modulators, each said amplitude modulator disposed in a section of one corresponding delay line and having means for adjusting an amplitude of each said delay line signal according to said corresponding control signal.

10. An optical transmission system as recited in claim 1, further comprising:
    a plurality of microlenses, each one of said microlenses providing optical focusing of one corresponding said delay line signal output; and
    a plurality of optical amplifiers, each one of said amplifiers providing optical amplification of one corresponding said delay line signal.

11. An optical transmission system, comprising:
    a source for transmitting an input optical signal;
    an optical array having a primary input for receiving said optical signal;
    a plurality of delay lines, each said delay line having an input, an output, and a predetermined optical path length;
    an optical splitter coupled to said primary input, for splitting said input optical signal into a plurality of delay line signals, each of said delay line signals being input to one corresponding delay line input and each said delay carries its respective delay line signal to a destination point located at said delay line outputs;
    means for producing a plurality of control signals, utilizing orthogonal code modulation, to control the modulation of an optical wave component of each said delay line signal; and
    means for modulating each said delay line optical wave component according to said corresponding control signal;
    and wherein said means for producing said plurality of control signals comprises:
        a beam splitter for redirecting a fraction of each said delay line signal;
        a lens located at an output of said beam splitter for coupling each said fractional delay line signal into a lens output;
        an optical detector disposed adjacent to said lens and receiving said lens output, said detector combining said fractional delay line signals to create a net signal;
        a processor having an input for receiving said net signal from said optical detector and means for generating each one of said control signals by independently determining an optimal modulation value of said wave component of one said corresponding delay line signal, wherein a value of said control signal corresponds to an adjustment in power of said net signal; and
        an output for outputting said plurality of control signals.

12. An optical transmission system as recited in claim 11, wherein said means for generating said control signals comprises:
    a plurality of servo control loops, each one of said servo control loops providing wave component feedback information for one corresponding said delay line, each servo control loop generating said corresponding control signal from said feedback information and a corresponding weight value.

13. An optical transmission system as recited in claim 12, wherein each said servo control loop is an orthogonally CDMA encoded servo control loop.

14. An optical transmission system, comprising:
    a source for transmitting an input optical signal;
    an optical array having a primary input for receiving said optical signal;
    a plurality of delay lines, each said delay line having an input, an output, and a predetermined optical path length;

an optical splitter coupled to said primary input for splitting said input optical signal into a plurality of delay line signals, each of said delay line signals being input to one corresponding delay line input and each said delay carries its respective delay line signal to a destination point located at said delay line outputs;

means for producing a plurality of control signals, utilizing orthogonal code modulation, to control the modulation of an optical wave component of each said delay line signal;

means for modulating each said delay line optical wave component according to said corresponding control signal;

a plurality of microlenses, each one of said microlenses providing a optical focusing of one corresponding said delay line signal output; and a plurality of optical amplifiers, each one of said amplifiers providing optical amplification of one corresponding said delay line signal;

wherein said means for producing a plurality of control signals comprises a processor for receiving electrical signals derived from output optical signals sampled at said delay line outputs, and for generating therefrom each one of said control signals by independently determining an optimal modulation value of said optical wave component of each of said corresponding delay line signals;

and further comprising a plurality of conjugate phase adjustors, each one of said conjugate phase adjustors imposing a point conjugate solution on the phase of one corresponding said delay line signal.

* * * * *